United States Patent [19]

Gneuss

[11] Patent Number: 5,498,334
[45] Date of Patent: Mar. 12, 1996

[54] FILTER FOR A PLASTIC (SYNTHETIC RESIN) MELT

[75] Inventor: Detlef Gneuss, Bad Oeynhausen, Germany

[73] Assignee: Gneuss Kunststofftechnik GmbH, Bad Oeynhausen, Germany

[21] Appl. No.: 160,511

[22] Filed: Dec. 1, 1993

[30] Foreign Application Priority Data

Dec. 2, 1992 [DE] Germany ............ 42 40 461.4

[51] Int. Cl.⁶ .................................. B01D 29/96
[52] U.S. Cl. ............ 210/236; 210/447; 210/489; 210/495; 210/498; 210/499; 210/330; 425/199
[58] Field of Search ............ 210/236, 489, 210/447, 495, 499, 498, 330; 425/198, 199, 197

[56] References Cited

U.S. PATENT DOCUMENTS 4,562,022  12/1985  Li et al. ............ 425/199
4,588,502  5/1986  Zibell et al. ............ 210/171

*Primary Examiner*—Matthew O. Savage
*Attorney, Agent, or Firm*—Herbert Dubno

[57] ABSTRACT

A filter for a synthetic resin melt has a housing formed from two blocks through which a melt channel for the passage of the plastics melt passes. A screen plate is rotatably mounted to intrude between the blocks and a plurality of recesses are distributed in a circular pattern around the periphery of the screen plate so that rotation can bring two of the recesses in to line with the channel. A plurality of filter elements are accommodated, one each in each recess, so that the plastic melt must pass through the filters in the recesses in line with the channel. To support the filter elements against melt pressure a stationary perforated plate is located in the channel immediately adjacent and downstream of the screen plate. By rotating the screen plate exhausted filter elements can be readily replaced. The filter elements are made of woven wire cloth and may be dished to prevent distortion of the mesh.

16 Claims, 7 Drawing Sheets

FILTER FOR A PLASTIC (SYNTHETIC RESIN) MELT

FIELD OF THE INVENTION

My present invention relates to a melt filter for the cleaning of plastic (synthetic resin) melts, particularly melts dispensed from extruders.

BACKGROUND OF THE INVENTION

U.S. Pat. No. 3,940,335 describes a melt filter which is combined with an extruder, in which a filter cloth is pulled from a supply reel and is supported in the extruder by a perforated plate. The pressure generated in the extruder is allowed to act on the discharged filter cloth to produce pulling forces for further transport of the filter cloth. This is achieved by cooling the discharged strip and a melt layer which adheres to it and partially remelting the melt layer. As a consequence separate filter cloth transport mechanisms are not needed. However, the filter cloth transport proceeds only very slowly and the transition from one filter cloth to another with a differently sized mesh requires stopping of the extruder and extensive assembly work.

Because of the disadvantages of the prior art, a rotatable filter plate system has been developed. Rotatable filter plates comprise recesses in a region corresponding to a melt channel. These recesses are arranged in a circle. Exchangeable perforated plates on which filter elements are situated may be inserted into the recesses. This offers, with small outlay, the possibility of rapid replacement of the filter elements and enables convenient substitution of a screen cloth of one mesh size by a screen cloth of another mesh size. When the clogged filter elements and the perforated plates which support them are removed, the filter elements must be cleaned before they are reused. This cleaning has been found to require a considerable outlay when using some cleaning processes and when cleaning is performed at high temperatures there is a danger that undesired vapors may be released.

OBJECTS OF THE INVENTION

It is an object of the invention to provide a melt filter of the kind having easily exchangeable filters such that replacement of clogged or used-up filter elements is facilitated and separate cleaning of the perforated plates is not necessary.

Another object is to provide an improved filter for synthetic resins in an extruder whereby drawbacks of earlier systems are avoided.

SUMMARY OF THE INVENTION

These objects are achieved according to the invention, in a screen assembly which has a housing formed by two blocks and having a melt channel extending through the blocks which admits the melt for filtering, a screen plate rotatably positioned between said blocks, and a plurality of recesses provided in the screen plate, the recesses being arranged on a circular path, each of the recesses being adapted to accommodate a replaceable filter element so that the screen plate can transport one or more of the filter elements into the melt channel whereby the melt must flow through the filter element, and a stationary perforated plate situated in the melt channel to support the filter element.

A single filter element is inserted into each recess in the screen plate and this element is advanced by driving the screen plate. The stationary perforated plate supports the filter element against the forces generated by the pressure differences occurring in the filter. The stationary perforated plate is no longer replaced together with the filter element and therefore need not be separately cleaned.

BRIEF DESCRIPTION OF THE DRAWING

The above and other objects, features and advantages of the present invention will become more readily apparent from the following description, reference being made to the accompanying drawing in which:

FIG. 3A is a section along the line IIIA—IIIA of FIG. 3;

FIG. 4A is a section along line IVA—IVA of FIG. 4;

FIG. 4B is a detail of the region IVB of FIG. 4A;

FIG. 6A is a section along the line VIA—VIA of FIG. 6;

SPECIFIC DESCRIPTION

Figure 1:
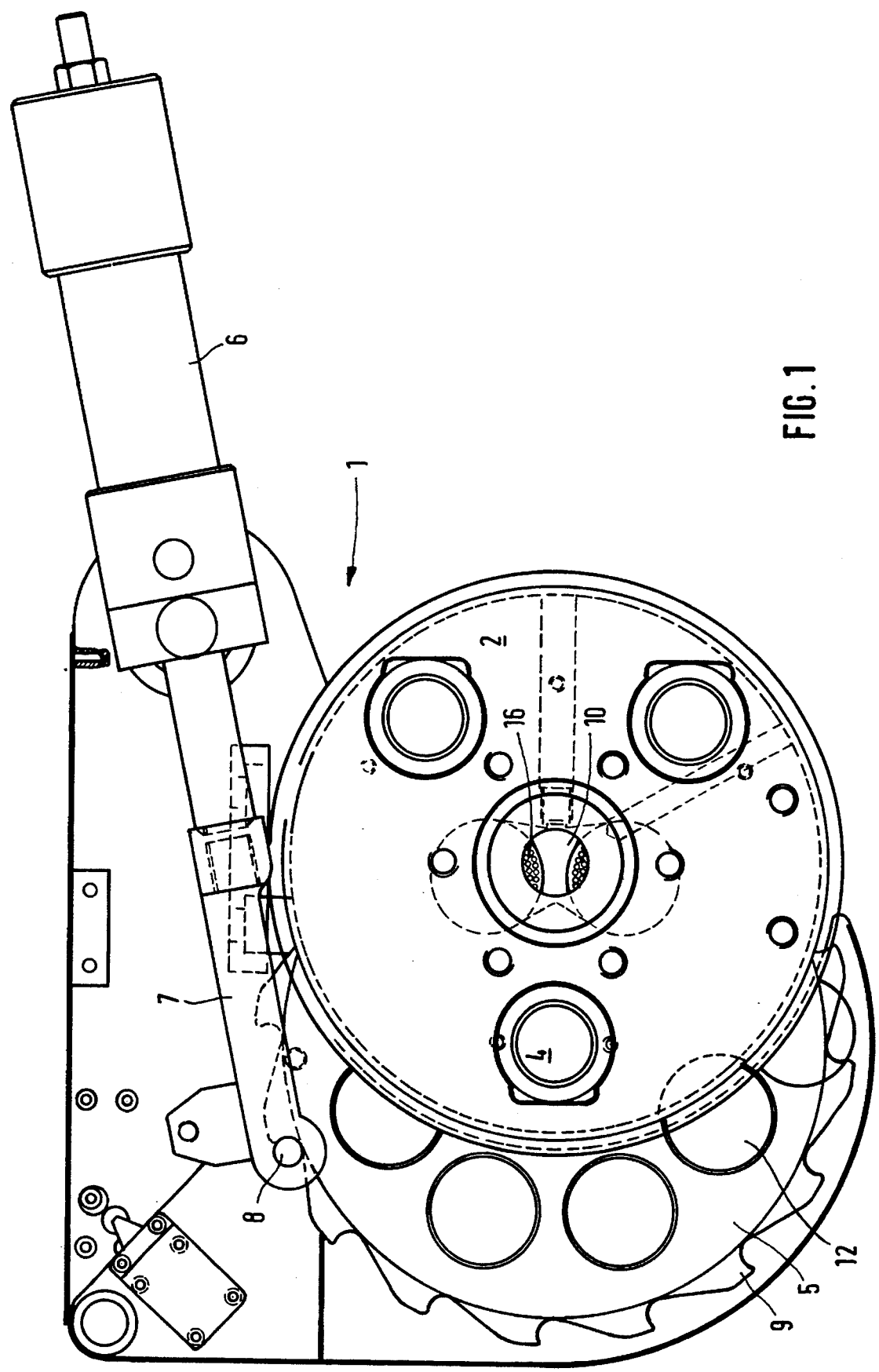
FIG. 1 is a side elevational view of a melt filter according to the invention.
Figure 2:
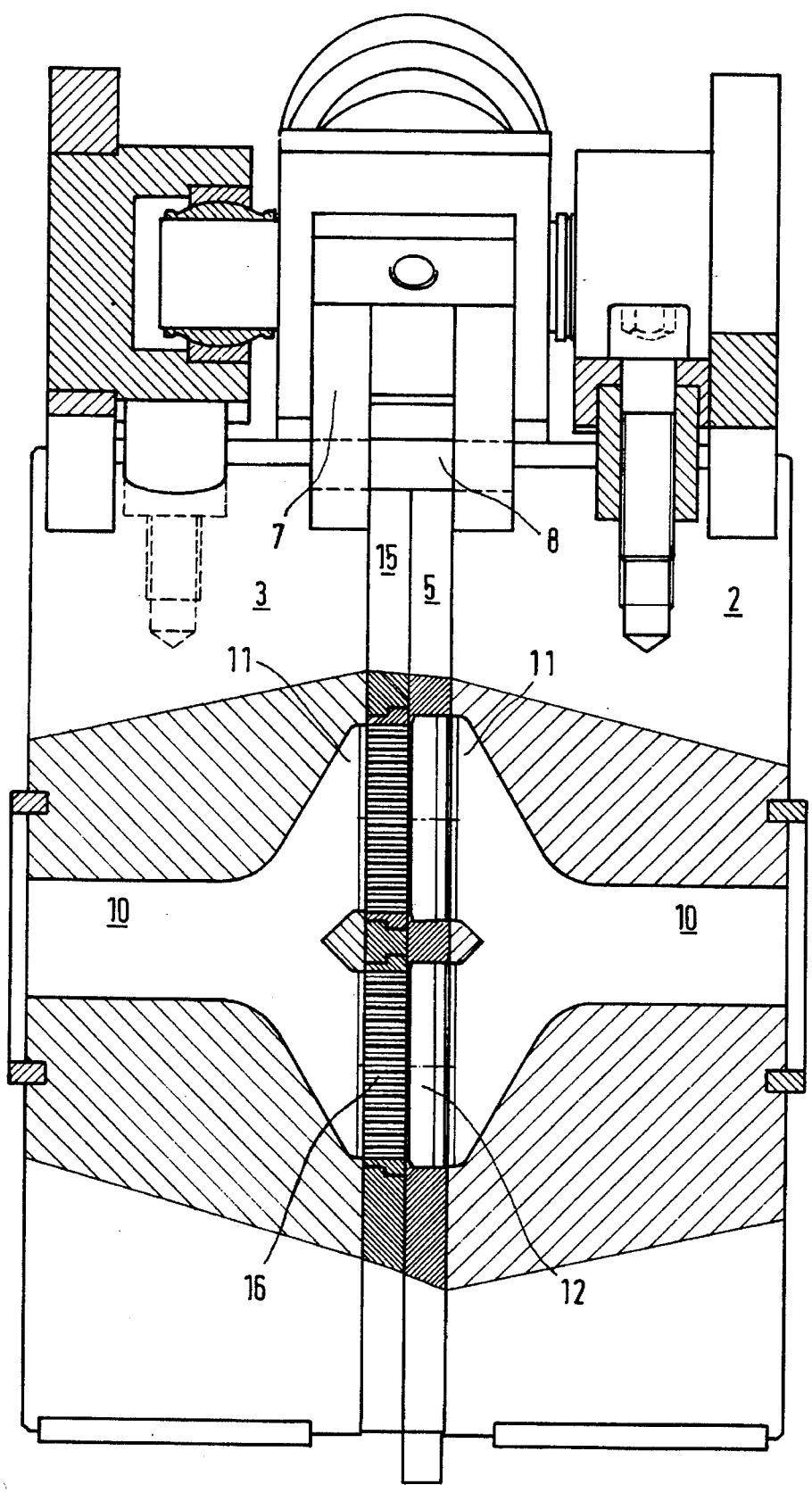
FIG. 2 is a vertical section through the melt filter of FIG. 1 along the axis of its melt channel.

FIG. 1 shows a melt filter the housing 1 of which, as shown in the vertical section in FIG. 2, is composed of two blocks 2, 3 connected together, via spacers, by clamping bolts 4.

On the spacer of the clamping bolt 4 shown on the left-hand side is mounted a screen plate 5, which is rotatable by means of a hydraulic or pneumatic ram 6. A connecting rod 7 forms an extension of the piston rod of the ram 6 and provides arms which straddle the periphery of the screen plate 5. The free ends of the arms are interconnected by a pawl 8. The periphery of the screen plate 5 is provided with ratchet teeth 9, so that on retraction of the piston rod of the ram 6 the screen plate 5 is turned clockwise (FIG. 1).

A melt channel 10 passes through the blocks 2 and 3 as shown in FIG. 2, and where it faces the screen plate 5, vertically widens and branches into two orifices 11 which are separated from each other by a web. The screen plate 5 is provided with recesses 12 therethrough, each of which serves to accommodate a filter element.

The recesses are arranged in a circle which intersects the centers of the orifices 11 and thereby the axes of the melt channel. To obtain simple driving conditions, the number of the ratchet teeth 9 preferably corresponds to the number of the recesses 12 or is an integral multiple thereof, e.g., is twice or three times greater so that an integral number of piston strokes will align the orifices 11 with the recesses 12.

The screen plate 5 is supported adjacent a stationary plate 15 having regions corresponding to the orifices 11 which are perforated or, as in the illustrated example, are always equipped with a perforated plate 16.

Figure 4:
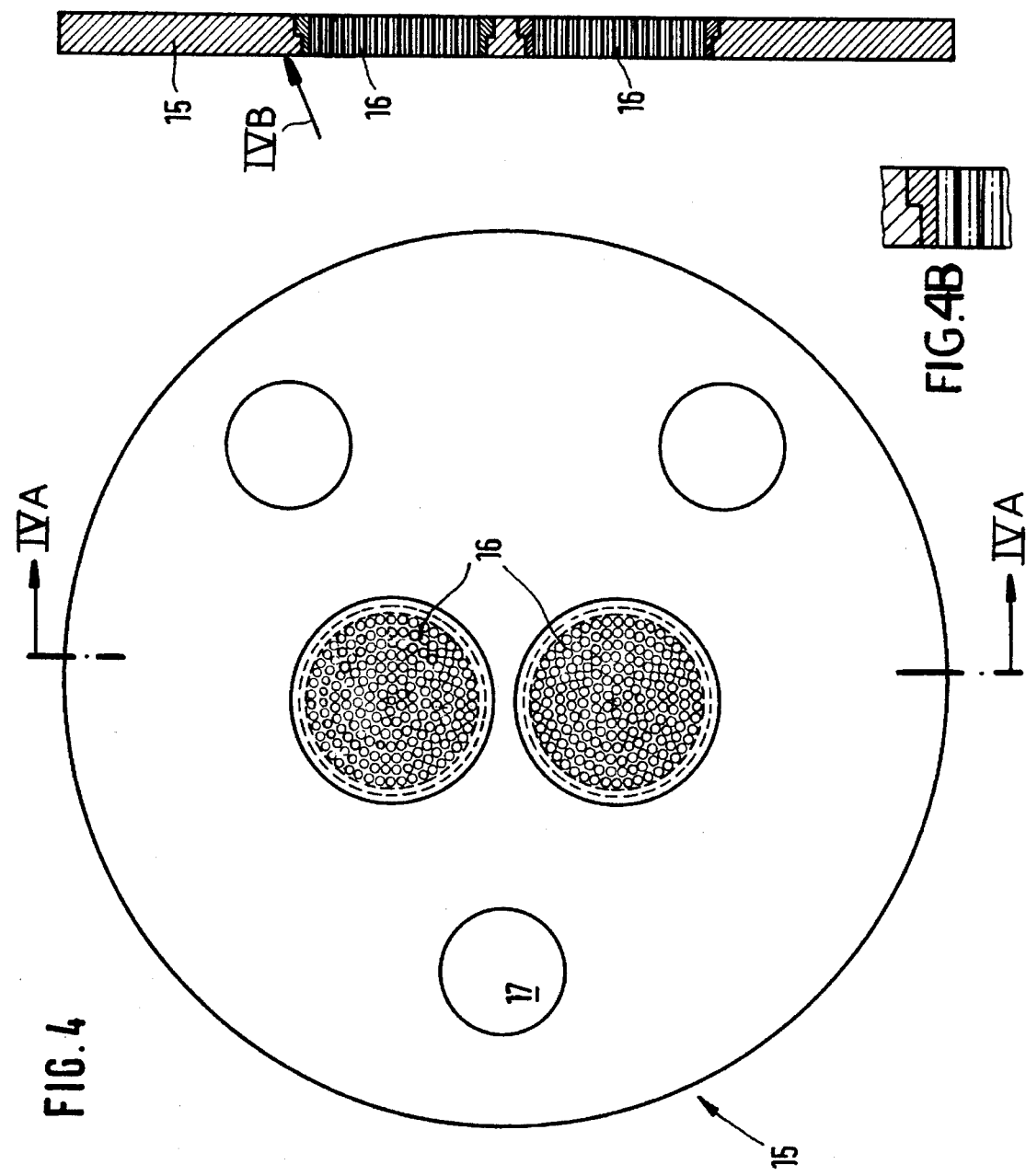
FIG. 4 is an elevational view of a support plate of the melt filter according to FIG. 1, the support plate being equipped with perforated plates.

As shown in FIGS. 4, 4A and 4B, the embodiment has a stationary plate with two perforated plates 16 disposed approximately diametrically opposite one another.

Figure 3:
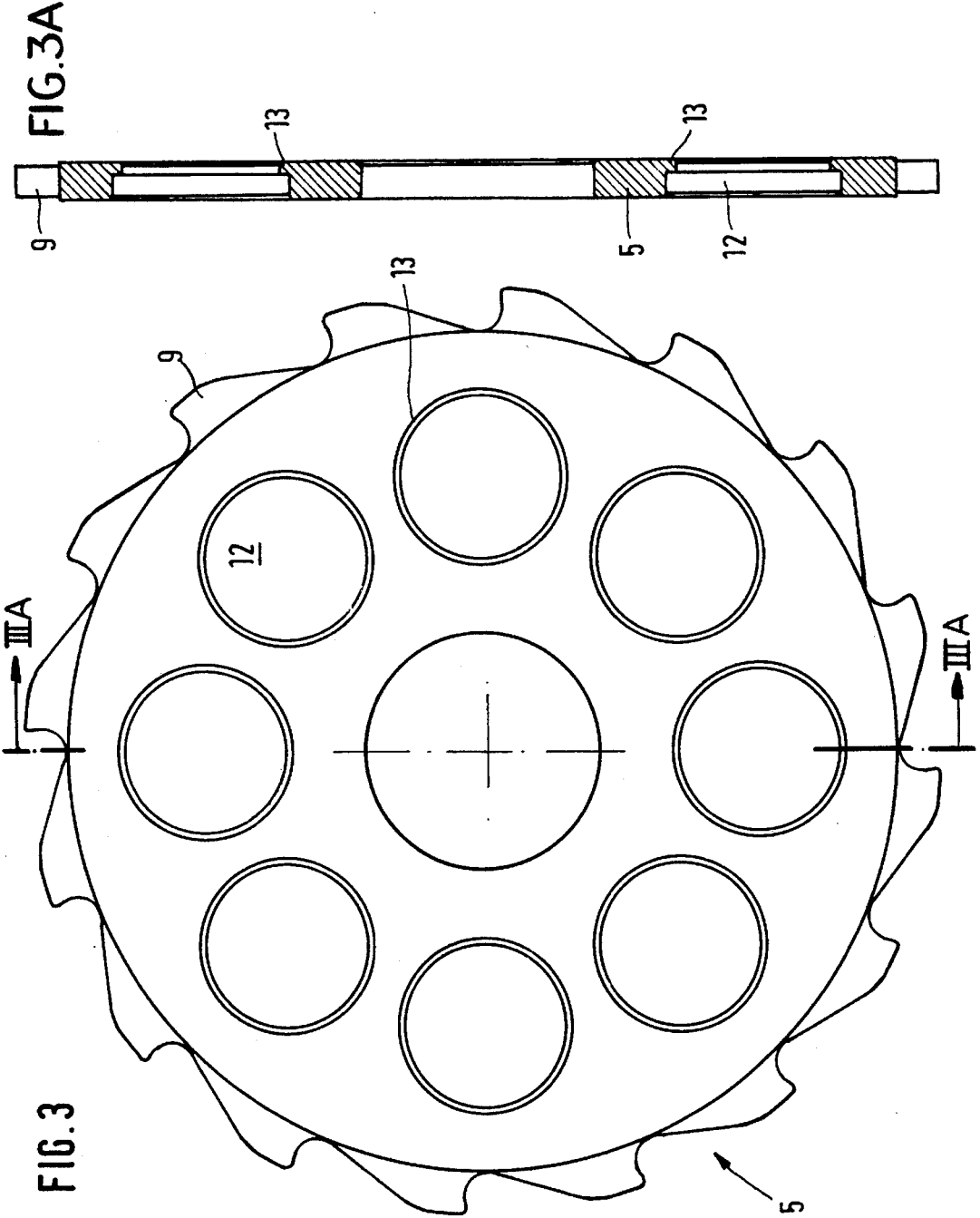
FIG. 3 is a front elevational view of the screen plate of the melt filter according to FIG. 1.

FIGS. 3 and 3A show, for clarification, an elevation and a vertical section through the turntable screen plate 5, and FIGS. 4 and 4A show an elevation and a vertical section of the plate 15. Three bores 17, through which pass the clamping bolts 4 to hold the plate 15 stationary, are shown.

In operation two of the recesses 12, each of which is equipped with a filter element 14, are moved into the melt channel 10, so that the filter elements are disposed between the two orifices 11 and each registers with a respective one of the two perforated plates 16. If a melt is now supplied to the melt channel 10 according to FIG. 1 from the front, or according to FIG. 2 from the right, it passes through both the moved-in filter elements 14 and, exerts on them a pressure difference between the inlet side and the outlet side of the melt channel 10. The filter elements are consequently pressed against the perforated plates 16 which perforated plates 16 support the filter elements 14.

After a predetermined time or alternatively when a predetermined difference of the melt pressure detected upstream and downstream of the filter element, is exceeded, the filters are changed, this is achieved by driving the screen plate 5. In an embodiment with two melt channel orifices arranged one above the other, this can take the form of transport by one pitch of the recesses 12 corresponding to two pitches of the ratchet teeth 9, so that one of the filter elements is swung out and the filter element situated formerly in the position of the higher one of the two orifices 11 is brought in front of the lower one of the perforated plates 16.

It is possible also to effect displacement by a halfpitch only, in which case the filter elements will be displaced to an intermediate position. This position may be maintained so that three filter elements stand offset in front of the two perforated plates 16.

Figure 8:
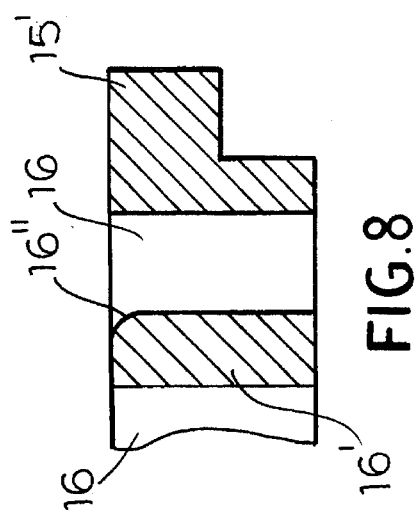
FIG. 8 is a cross sectional view showing an edge of the perforated plate which is rounded off.
Figure 9:
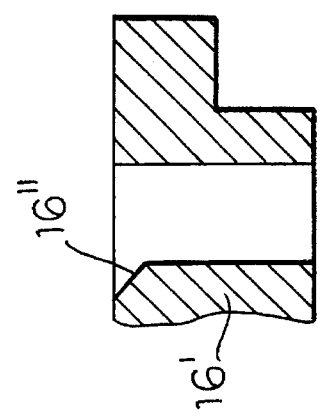
FIG. 9 is a view of a plate have an edge which is beveled or flattened in the configuration of a ramp.

In order to make the displacement of the filter elements easier and to avoid damage to them as they advance while high pressure is applied, it is useful to flatten individual elements of the perforated plates at least in their upstream edge regions situated at the front of the plates and in the direction of transport, to bevel or round-off these edges or allow them to rise like ski runners. As can be seen from FIGS. 8–9, the perforated plate can have webs 16' defining perforations therein, which webs are rounded of at 16" or bevelled in the shape of a ski runner as shown at 16" to facilitate removal of the filter element across the plate. The apertures of the support plates may be made, at least in the region near the support surfaces, as elongate holes extending in the direction of movement of the filter elements. Thus, obstructing transverse elements are minimized or largely avoided.

The structure of the filter element is such as to facilitate its movement under the relatively high pressure. Normally the filter element is made of a cloth of woven wire and has several layers thereof. In this case, while the weft remains in general within a common plane, the warp always protrudes above the common plane. Advantageously the filter cloth is oriented in such a way that the length component of the warp wires extends in the direction of movement.

A further problem is keeping the filter elements sealed in the recesses 12 of the screen plate 5 to prevent the melt leaking unfiltered past the filter. It has been found that the filter elements bulge under the influence of pressure so that displacements within the filter cloth may occur. These displacements adversely influence the predetermined mesh size causing meshes larger than prescribed to form by the displacement of wires in the bulge area.

Figure 5:
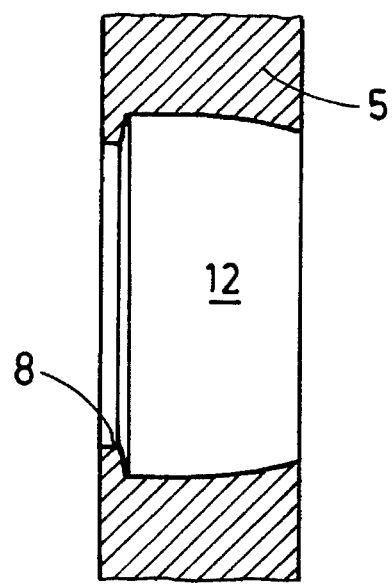
FIG. 5 shows, on a larger scale and in partial section, a recess of a screen plate.

Each recess 12, which receives a filter 14, has an axial cross-section which is preferably similar to that shown in FIG. 5. The recess 12 includes an annular shoulder 18 near the downstream opening, upon which the filter element sits during use. The upstream opening of the recess is made smaller than the diameter of the recess near the shoulder 18 so that the filter element is retained. As shown in the embodiment illustrated, the reduction in diameter from the shoulder to the upstream opening is preferably progressive and may be achieved by curving the recess wall section. The shoulder 18 preferably offers a conical support surface to the rim of the filter element 14 so that during application of the operating pressure the filter element is sealingly pressed onto the shoulder and causes the filter element to center itself, to obtain a good seal.

Figure 6:
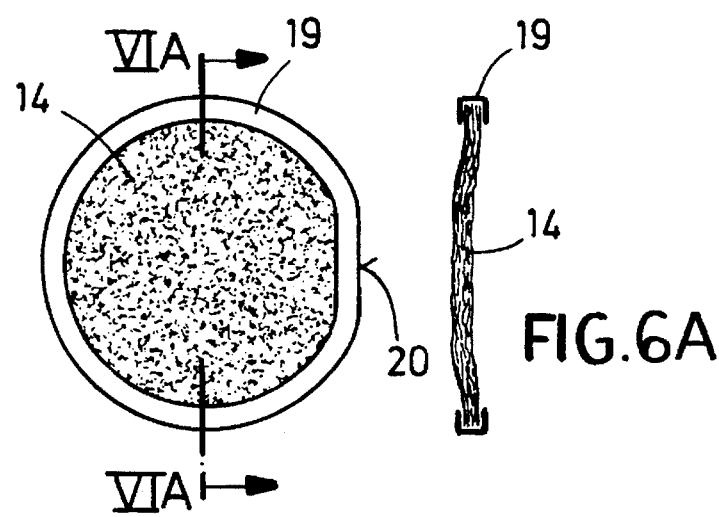
FIG. 6 is an elevational view of a filter element which may be inserted into the recesses.
Figure 6C:
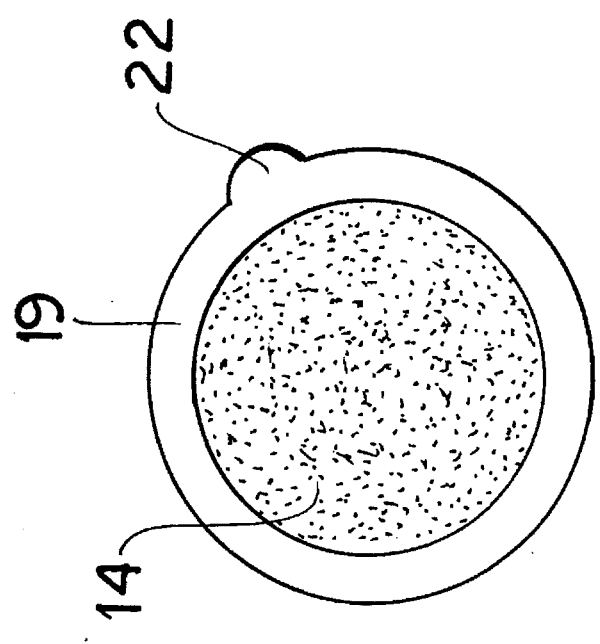
FIG. 6C is a elevational view of a filter element including a buldge.

To maintain shape, to make sealing easier, and to retain the filter cloth or cloths positioned one on top of the other, a collar 19 having a U-shaped profile engages and clamps the periphery of the filter element shown in FIGS. 6 and 6A.

The filter element 14 shown in the elevation of FIG. 6 is dished so that it is concave when viewed from upstream and so that the downstream surface of the filter element 14 is closely adjacent the stationary plate 15 or perforated support plates 16 upon installation. This enables the deformation which takes place on loading to be adjusted for. Thus, the adverse deformation of the mesh can be alleviated.

Figure 6B:
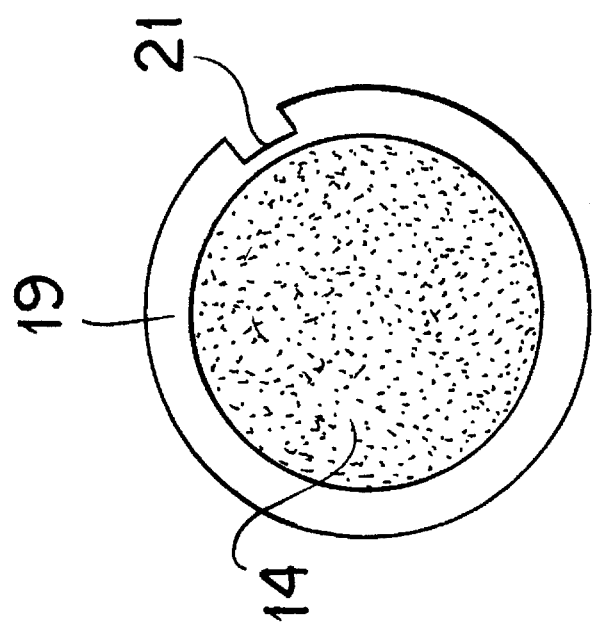
FIG. 6B is a elevational view of a filter element including a notch.

In order to maintain the most advantageous orientation (described above) of the wires used as the weft with the direction of peripheral displacement of the screen plate, the collar 19 deviates from a regular, e.g. round or regularly polygonal, geometry, but, as apparent from the plan view in FIG. 6, is provided with deviations 20 from such regularity, and the recess 12 is provided with corresponding positively engaging deviations, so that insertion of the filter element is positive and may take place only in the selected preferred direction. Because this direction is in principle also reversible, two such deviations could also be provided enabling insertion in a first position and a second position turned through 180°. It has been found that the simplest arrangement is to somewhat squeeze the ring at one point in the shape of a chord, and possibly additionally to do the same on the opposite side, in which case the complementary part of the shape of the recess 12 need by made only once. It is, however, also possible to provide any other deviations from a regular shape (polygon, circle), possibly also projecting notches 21 (FIG. 6B) on the ring or projecting elements or buldges 22 (FIG. C) incorporated in, or welded to, the ring. In any of these cases the insertion of the filter elements in the preferred direction is positively ensured.

Variants of the melt channel are possible from a channel which is cylindrical along its whole length or widens in the region of the filter elements or branches.

Figure 7:
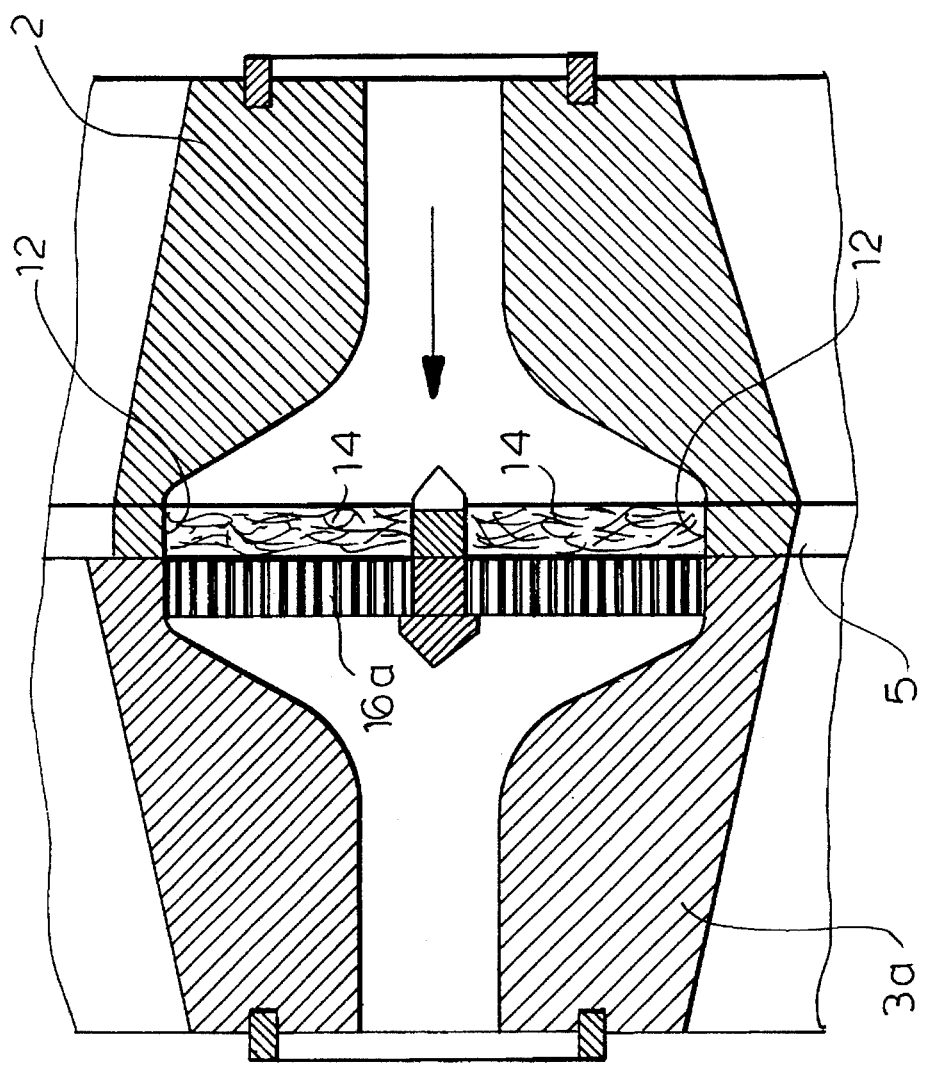
FIG. 7 is a section through another embodiment.

In an alternative embodiment (FIG. 7), the downstream block 3a has the perforated plate 16a for support of the filter elements integral therewith.

I claim:

1. A filter for a synthetic resin melt comprising:

a housing formed by two blocks and having a melt channel extending through the blocks from an upstream side to a downstream side which conducts a melt for filtering one of said blocks at said upstream side being an upstream block, the other of said blocks at said downstream side being a downstream block;

a screen plate positioned between said blocks, said screen plate being provided with a plurality of recesses provided in the screen plate and disposed on a circular path;

means for rotating said screen plate to successively position said recesses along said channel;

respective replaceable filter elements received in said recesses so that the screen plate can transport at least one of the filter elements into the melt channel whereby the melt must flow through the filter element; and a stationary perforated plate situated in the melt channel downstream of said screen plate to support each filter element transported into the melt channel.

2. The filter defined in claim 1 wherein the perforated plate has webs defining perforations therein and upstream edges of the webs facing in the direction of rotation of the screen plate are bevelled or rounded-off to facilitate movement of the filter element.

3. The filter defined in claim 1 wherein upstream aperture portions of perforations of the perforated plate are elongated in a direction of movement of the screen plate to facilitate transport of the filter element past said perforated plates.

4. The filter defined in claim 1 wherein the perforated plate is provided in a stationary support plate between said blocks and downstream of said screen plate.

5. The filter defined in claim 4 wherein the stationary support plate supports two perforated plates in the channel.

6. The filter defined in claim 1 wherein the downstream block receives the perforated plate.

7. The filter defined in claim 1 wherein the perforated rated plate is incorporated in a stationary support plate received in said down stream block.

8. The filter defined in claim 1 wherein the filter elements are held in a frame which holds several filter layers together.

9. The filter defined in claim 1 wherein the filter element is comprised of several layers held together by a collar.

10. The filter defined in claim 9 wherein each recess is formed with an upstream facing shoulder for seating the collar.

11. The filter defined in claim 10 wherein the shoulder is frustoconical to center the filter under the action of operating pressure.

12. The filter defined in claim 1 wherein an upstream opening of each recess has a span less than a downstream portion of the respective recess where the filter element is accommodated to ensure filter element retention.

13. The filter defined in claim 12 wherein a change in span of each recess is achieved by frusto-conically widening the recess walls in the downstream direction.

14. The filter defined in claim 1 wherein each filter element is preformed to be dished to alleviate deformation by the action of pressure.

15. The filter defined in claim 1 wherein the complementary profiles of each filter element and each recess are irregularly shaped so that the filter element can only be accommodated in the recess aligned so as to promote the transport of the filter element across the perforated plate.

16. The filter defined in claim 15 wherein the irregular shape is achieved by the provision of a peripheral notch or bulge.

* * * * *